United States Patent
Hickman et al.

(10) Patent No.: US 7,734,753 B2
(45) Date of Patent: Jun. 8, 2010

(54) APPARATUS, SYSTEM, AND METHOD FOR FACILITATING MANAGEMENT OF LOGICAL NODES THROUGH A SINGLE MANAGEMENT MODULE

(75) Inventors: John Edward Hickman, Salinas, CA (US); Steven Richard Van Gundy, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 1252 days.

(21) Appl. No.: 10/963,266

(22) Filed: Oct. 12, 2004

(65) Prior Publication Data

US 2006/0095702 A1    May 4, 2006

(51) Int. Cl.
G06F 15/173 (2006.01)
G06F 13/00 (2006.01)

(52) U.S. Cl. .................................. 709/223; 711/100
(58) Field of Classification Search ............. 709/223; 711/100
See application file for complete search history.

(56) References Cited

U.S. PATENT DOCUMENTS

| | | | |
|---|---|---|---|
| 5,923,890 A | 7/1999 | Kubala et al. | 395/800.01 |
| 6,055,537 A * | 4/2000 | LeTourneau | 707/101 |
| 6,073,209 A | 6/2000 | Bergsten | 711/114 |
| 6,189,145 B1 | 2/2001 | Bellin, Jr. et al. | 717/11 |
| 6,279,046 B1 | 8/2001 | Armstrong et al. | 710/5 |
| 6,282,610 B1 | 8/2001 | Bergsten | 711/114 |
| 6,327,594 B1 * | 12/2001 | Van Huben et al. | 707/200 |
| 6,349,357 B1 * | 2/2002 | Chong, Jr. | 711/111 |
| 6,421,679 B1 | 7/2002 | Chang et al. | 707/103 R |
| 6,425,035 B2 * | 7/2002 | Hoese et al. | 710/315 |
| 6,426,959 B1 * | 7/2002 | Jacobson et al. | 370/468 |
| 6,477,139 B1 | 11/2002 | Anderson et al. | 370/216 |
| 6,574,655 B1 * | 6/2003 | Libert et al. | 709/200 |
| 6,640,278 B1 * | 10/2003 | Nolan et al. | 711/6 |

(Continued)

FOREIGN PATENT DOCUMENTS

EP    0490980    5/1999

(Continued)

OTHER PUBLICATIONS

Dino Quintero et al. "An introduction to CSM 1.3 for AIX 5L", ibm.com/redbooks.

(Continued)

*Primary Examiner*—Benjamin R Bruckart
*Assistant Examiner*—Guang Li
(74) *Attorney, Agent, or Firm*—Kunzler Needham Massey & Thorpe

(57) ABSTRACT

An apparatus, system, and method are provided for facilitating management of logical nodes through a single management module. The present invention includes a communication module that selectively communicates a management command from a single management module to one or more logical nodes. A translation module translates the management command into one or more functionally equivalent software-layer commands recognized by one of the software layers of the one or more logical nodes. The software-layer commands are compatible with each logical node. A direction module directs the one or more software-layer commands to an appropriate one of the software layers according to a management command scope. The present invention can address management commands to a plurality of logical nodes having disparate operating systems and executing applications.

32 Claims, 6 Drawing Sheets

U.S. PATENT DOCUMENTS

| | | | |
|---|---|---|---|
| 6,779,058 B2 | 8/2004 | Kishi et al. | 710/60 |
| 6,985,983 B2* | 1/2006 | Pellegrino et al. | 710/200 |
| 7,051,101 B1* | 5/2006 | Dubrovsky et al. | 709/225 |
| 7,325,239 B2* | 1/2008 | Hariharan et al. | 719/328 |
| 7,401,338 B1* | 7/2008 | Bowen et al. | 719/328 |
| 2002/0114341 A1* | 8/2002 | Sutherland et al. | 370/428 |
| 2002/0124040 A1 | 9/2002 | Foster et al. | 709/100 |
| 2002/0124063 A1 | 9/2002 | Foster et al. | 709/221 |
| 2002/0124166 A1 | 9/2002 | Lee et al. | 713/100 |
| 2002/0174270 A1* | 11/2002 | Stecyk et al. | 710/1 |
| 2003/0055933 A1 | 3/2003 | Ishizaki et al. | 709/223 |
| 2003/0097393 A1 | 5/2003 | Kawamoto et al. | 709/1 |
| 2003/0105812 A1 | 6/2003 | Flowers, Jr. et al. | 709/203 |
| 2003/0105829 A1 | 6/2003 | Hayward | 709/214 |
| 2003/0115442 A1 | 6/2003 | Whitney | 713/1 |
| 2003/0154271 A1* | 8/2003 | Baldwin et al. | 709/223 |
| 2003/0212571 A1 | 11/2003 | Sazawa et al. | 705/1 |
| 2003/0212884 A1 | 11/2003 | Lee et al. | 713/1 |
| 2004/0098728 A1* | 5/2004 | Husain et al. | 719/313 |
| 2004/0143664 A1 | 7/2004 | Usa et al. | 709/226 |

FOREIGN PATENT DOCUMENTS

| | | |
|---|---|---|
| WO | WO 02/065329 | 8/2002 |

OTHER PUBLICATIONS

Dale Barrick et al. "Logical partitions on IBM PowerPC; A guide to working with LPAR on Power5 i5 servers", ibm.com/redbooks.

Keigo Matsubara et al. "A practical guide for resource monitoring and control (RMC)", ibm.com/redbooks.

By T. L. Borden et al. "Multiple operating systems on one processer complex", IBM Systems Journal, vol. 28, No. 1, 1999, p. 104-123.

* cited by examiner

APPARATUS, SYSTEM, AND METHOD FOR FACILITATING MANAGEMENT OF LOGICAL NODES THROUGH A SINGLE MANAGEMENT MODULE

BACKGROUND OF THE INVENTION

1. Field of the Invention

The invention relates to data storage computer systems. Specifically, the invention relates to apparatus, systems, and methods for facilitating management of logical nodes through a single management module.

2. Description of the Related Art

Computer and information technology continues to progress and grow in its capabilities and complexity. In particular, data storage systems continue to evolve to meet the increasing demands for reliability, availability, and serviceability of the physical data storage system and its hardware, software, and various other components. Data storage systems often handle mission critical data. Consequently, data storage systems are expected to remain on-line and available according to a 24/7 schedule. Furthermore, data storage systems are expected to handle power and service outages, hardware and software failures, and even routine system maintenance without significantly compromising the reliability and availability to handle data Input/Output (I/O) from hosts.

FIG. 1 illustrates a conventional data storage system 100. The system 100 includes one or more hosts 102 connected to a storage subsystem 104 by a network 106 such as a Storage Area Network (SAN) 106. The host 102 communicates data I/O to the storage subsystem 104. Hosts 102 are well known in the art and comprise any computer system configured to communicate data I/O to the storage subsystem 104.

One example of a storage subsystem 104 suitable for use with the present invention is an IBM Enterprise Storage Servers® available from International Business Machines Corporation (IBM) of Armonk, N.Y. To provide reliability, availability, and redundancy, the storage subsystem 104 includes a plurality of host adapters (not shown) that connect to the SAN 106 over separate channels. The host adapters 108 may support high speed communication protocols such as Fibre Channel. Of course, various other host adapters 108 may be used to support other protocols including, but not limited to, Internet Small Computer Interface (iSCSI), Fibre Channel over IP (FCIP), Enterprise Systems Connection (ESCON), InfiniBand, and Ethernet. The storage subsystem 104 stores and retrieves data using one or more mass storage devices 108 such as, but not limited to Direct Access Storage Devices, tape storage devices, and the like.

As hardware costs have gone down, data storage systems 100 have become more complex due to inclusion of redundant hardware and hardware subsystems. Often, the hardware components are highly susceptible to failure. Consequently, the storage subsystem 104 may include one or more processors, electronic memory devices, host adapters, and the like.

Typically, to make most productive use of the redundant hardware, the hardware is specifically allocated or shared between a plurality of logical nodes 110. A logical node 110 represents an allocation of the computing hardware resources of the storage subsystem 104 such that each logical node 110 is capable of executing an Operating System (OS) 112 independent of another logical node 110. In addition, each logical node 110 operates an independent set of applications 114. The logical nodes 110 appear as separate physical computing systems to the host 102.

A coordination module 116, also known as a Hypervisor (PHYP) 116, coordinates use of dedicated and shared hardware resources between two or more defined logical nodes 110. The PHYP 116 may be implemented in firmware on a dedicated processor. Typically, the logical nodes 110 share memory. The PHYP 116 may ensure that logical nodes 110 do not access inappropriate sections of memory.

Separating the storage subsystem 104 into a plurality of logical nodes 110 allows for higher reliability. If one logical node 110 crashes/fails due to a software or hardware problem, one or more other logical nodes 110 may be used to continue or restart the tasks that were being performed by the crashed logical node 110.

Management and control of the plurality of logical nodes 110 is a challenge. Any management, control, maintenance, monitoring, troubleshooting or service operation should be coordinated with the constant I/O processing so that the 24/7 availability of the storage subsystem 104 is not compromised. Typically, a management console 118 manages the storage subsystem 104 via control communications (referred to herein as "out-of-band communication") separate from the I/O channels.

The storage subsystem 104 may include a network adapter, such as an Ethernet card, for out-of-band communications. The management console 118 may comprise a separate computer system such as a workstation executing a separate OS and set of management applications. The management console 118 allows an administrator to interface with the PHYP 116 to start (create), stop, and configure logical nodes 110.

Unfortunately, the management capabilities of the management console 118 are severely limited. In particular, the logical nodes 110 are completely independent and unrelated. Consequently, to manage a plurality of logical nodes 110 for example, to set a storage space quota, an administrator must login to each node 110 separately, make the change, and then log out. This process is very tedious and can lead to errors as the number of logical nodes 110 involved in the operation increases. Such management tasks are complicated by the fact that different OSes 112 and/or storage applications 114 may reside on each node 110. Consequently, administrators may have to use different command sets and different parameters for each node 110.

The repetitive nature of such a change is exacerbated in a storage subsystem 104 where nodes 110 may be highly uniform and may differ in configuration by something as minor as a name. Managing the nodes 110 separately may require significant time and expense. In addition, an administrator may be the only one who knows that two similar nodes 110 are to be similarly configured because there is no internal relationship between the nodes 110.

Furthermore, the management console 118 provides very few management commands. Typically, the management console 118 is limited to commands that start (create), stop, and configure logical nodes 110 themselves. The management console 118 fails to allow an administrator to send management commands to the OS 112 or applications 114 of one or more logical nodes 110. Instead, the administrator must login to each node, manually shutdown and applications 114 and then the OS 112. Then, the administrator can stop the node 110 in order to perform some maintenance operation. The management console 118 also fails to send management commands to more than one node 110 at a time regardless of whether two or more nodes 110 share a relationship.

The management console 118 conventionally only controls nodes of a single storage subsystem 104. To control multiple storage subsystems 104, which is common in modern enterprise systems, the administrator must login to each node 110 separately and may have to physically move to a different management console 118 machine to complete the management operations. The high number of nodes 110 that must each be individually managed limits the administrator's effectiveness. In addition, the independent nodes 110 make automated tools for management more difficult to implement and configure.

From the foregoing discussion, it should be apparent that a need exists for an apparatus, system, and method for facilitating management of logical nodes through a single management module. Beneficially, such an apparatus, system, and method would provide a common command set for management and control of disparate nodes 110 as well as the OSes 112 and applications 114 of the nodes 110. In addition, the apparatus, system, and method would support relationships between nodes 110 such that management commands sent to one node 110 are automatically implemented on all nodes sharing that relationship. Furthermore, the apparatus, system, and method would support management of a plurality of hardware platforms, such as for example storage subsystems 104, from a single management module. Each platform may include one or more logical nodes 110.

SUMMARY OF THE INVENTION

The present invention has been developed in response to the present state of the art, and in particular, in response to the problems and needs in the art that have not yet been met to facilitate management of logical nodes through a single management module. Accordingly, the present invention has been developed to provide an apparatus, system, and method to facilitate management of logical nodes through a single management module that overcomes many or all of the above-discussed shortcomings in the art.

An apparatus according to the present invention includes a communication module, a translation module, and a direction module. The communication module selectively communicates a management command from a single management module to one or more logical nodes. The management command is uniform for each logical node. Two or more logical nodes may be related to provide redundancy of hardware dedicated to each of the logical nodes. In one embodiment, the communication module automatically communicates the management command to each of the logical commands.

The translation module translates the management command into one or more functionally equivalent software-layer commands. The software-layer commands are recognized by one of the software layers of the one or more logical nodes. In addition, the software-layer commands are configured to suit the compatibility requirements of each logical node. For example, the proper software-layer command syntax and semantics are provided by the translation module based on the logical node receiving the software-layer commands. The direction module directs the one or more software-layer commands to an appropriate one or more of the software layers according to a management command scope. In one embodiment, the software layers comprise at least an application layer, a system layer, and a firmware layer. The management scope defines what layer the management command is directed to.

In one embodiment, the one or more logical nodes comprise at least one pair of logical nodes in a peer-to-peer domain such that a first logical node of the pair mirrors data processing operations of a second logical node of the pair. Collectively, in another embodiment, the pair of logical nodes define an independently manageable Storage Facility Image (SFI). The communication module may be configured to send the management commands directly to a plurality of SFIs. Alternatively, or in addition, the pair of logical nodes define an independently manageable Storage Application Image (SAI) and wherein the communication module is further configured to send the management command to a plurality of SAIs.

In one embodiment, the apparatus includes a user interface configured to allow a user to direct the management command to a domain, the domain comprising at least two logical nodes. The user interface may communicate with the single management module which in certain embodiments comprises a dedicated hardware management device.

The communication module, translation module, and direction module may cooperate to pass the software-layer commands through a management subsystem linking the management module and the one or more logical nodes. The management subsystem may comprise an object model representative of firmware, software, hardware, and logical entities present on the logical nodes. In certain embodiments, the one or more logical nodes comprise Logical Partitions (LPARS) of a common hardware platform. The LPARS may be configured such that each LPAR executes on a separate Central Electronics Complex (CEC) of the common hardware platform. These LPARS may further be related such that commands executed on one LPAR are automatically implemented on the other LPAR.

A computer readable medium of the present invention is also presented including machine-readable instructions configured to perform operations to facilitate management of logical nodes through a single management module. In one embodiment, the operations include an operation to communicate a management command selectively from a single management module to one or more logical nodes. Another operation translates the management command into one or more functionally equivalent software-layer commands recognized by one of the software layers of the one or more logical nodes. The software-layer commands are configured for compatibility with each logical node. Finally, an operation is executed to direct the one or more software-layer commands to at least one of the software layers according to a management command scope. The management command scope reflects the level of the logical node that the management command intends to address.

The present invention also includes embodiments arranged as a system, method, and an apparatus that comprise substantially the same functionality as the components and steps described above in relation to the apparatus and method. The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of select embodiments of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 2:
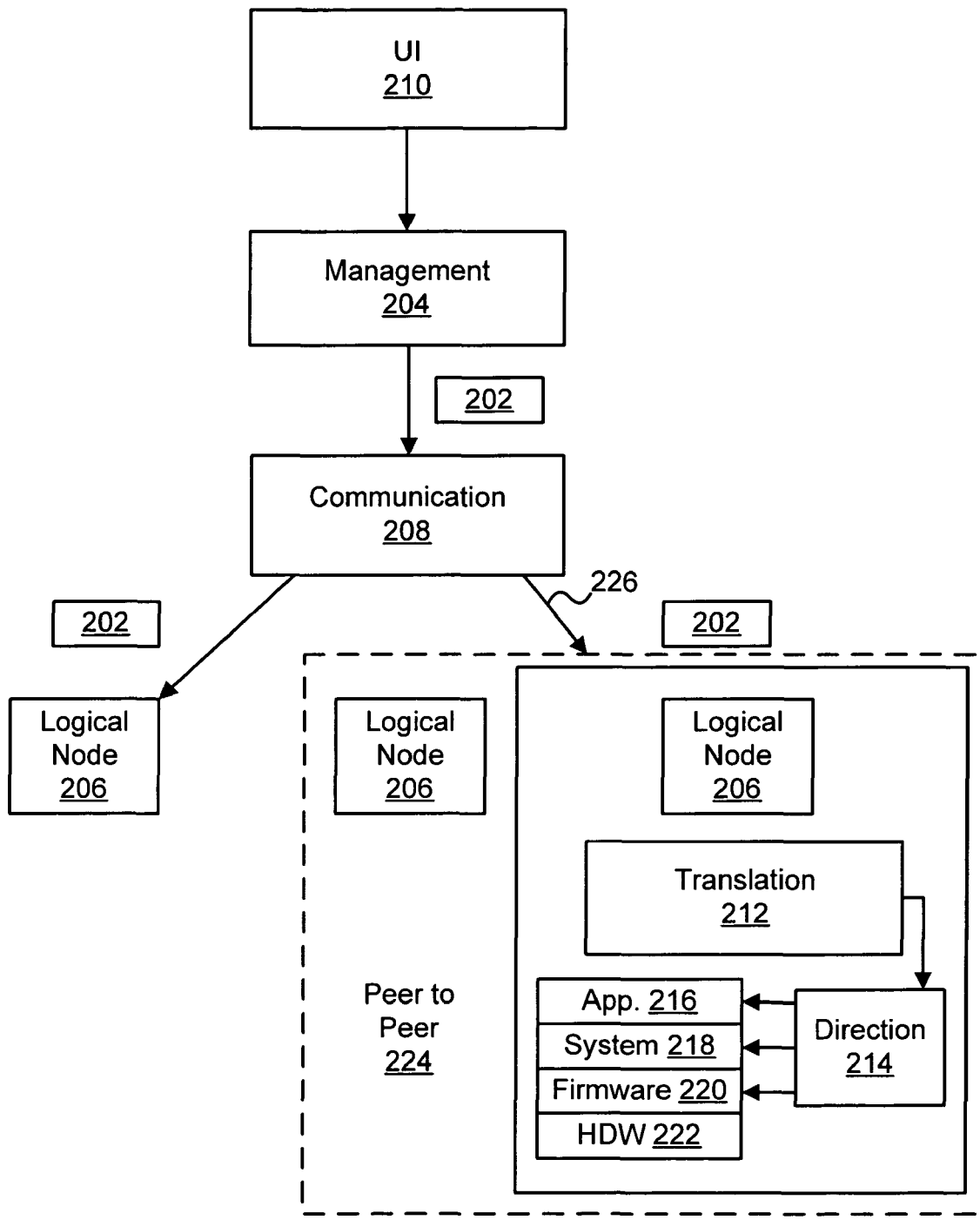
FIG. 2 is a logical block diagram illustrating one embodiment of an apparatus for facilitating management of logical nodes through a single management module in accordance with the present invention.

FIG. 2 illustrates a logical block diagram of components and modules that may be organized to facilitate management of logical nodes through a single management module. Typically, management commands 202 originate from a management module 204. The management module 204 in one embodiment may comprise software or firmware operating on a dedicated management hardware device. Alternatively, the management module 204 may operate on a logical node 206 in communication with other logical nodes 206. The management module 204 is in communication with one or more logical nodes 206.

Preferably, the management module 204 includes a predefined set of management commands 202 and a registry of the logical nodes 206 the management module 204 is configured to manage. The management commands 202 are preferably generalized commands that can be applied to one or more logical nodes 206 in order to monitor, manage, service, or control the logical node 206. Furthermore, the management commands 202 may be classified into groups based on management command scope.

Management commands 202 are designed to control a plurality of layers of hardware, firmware, and software that cooperate to define the logical node 206. The layers range from low-level hardware components to high-level applications, threads and processes that operate on the logical node 206. One example of low level hardware components includes LEDs that a management command 202 lights to identify a particular network adapter among an array of network adapters. Other examples of different layers are described in more detail below. Management scope as used herein means all management commands that affect a specific layer of hardware and software/firmware defining a logical node 206.

In certain embodiments, the management commands 202 may include an indicator representing the management scope. Alternatively, the communication architecture used for the management commands 202 may define the proper management scope. For example, in an object-oriented embodiment, the inheritance hierarchy among the objects may define the proper management scope. Certain dependent objects may depend solely from a single management scope. Consequently, the management scope is communicated by way of the inheritance relationship between the objects.

The management commands 202 along with explicit or implicit management scope are passed to a communication module 208. In one embodiment, the communication module 208 selectively determines which logical nodes 206 are to receive a particular management command 202. Those of skill in the art recognize that the communication module 208 may make this determination using various techniques.

In one embodiment, the communication module 208 references a set of logical nodes 206 defined by the management module 204. The set may comprise all or some of the logical nodes 206 managed by the management module 204. The set may be defined in various data structures including a list, an array, a structure, an object, or the like. In certain embodiments, at least two logical nodes 206 are organized into a domain. A domain represents a grouping of at least two logical nodes 206.

The domain or logical nodes 206 intended to receive a management command 202 may be designated manually by a user through a User Interface (UI) 210. The UI 210 allows a user to control and configure operation of the management module 204. the UI 210 may be presented by management module 204. Alternatively, instead of, or in addition to, manual logical node 206 designation, scripts or other automated tools may designate the domain and/or logical nodes 206 for the management command 202.

Once the logical nodes 206 for a management command 202 are identified, the communication module 208 sends the management command 202 to the appropriate logical nodes 206. Preferably, the management command 202 in the illustrated embodiment, is still in a generic format.

In one embodiment, a translation module 212 receives a management command 202 in the generic format and translates the management command to one or more functionally equivalent software-layer commands. Typically, a single management command 202 maps to a single software-layer command. However, because each logical node 206 may be different, a single management command 202 may require a plurality of software-layer commands for proper implementation on a particular logical node 206. The translation module 212 is configured to map management commands to software-layer commands having the syntax and semantics, including arguments, required by the particular logical node 206. In this manner, generic management commands are automatically converted to functionally equivalent software-layer commands compatible with each particular logical node 206.

Furthermore, the translation module 212 may add software-layer commands to accommodate certain hardware or software dependencies of one logical node 206 that may differ from another logical node 206. For example, a logical node 206 running LINUX may require that pending print jobs be flushed before executing a shutdown command. A logical node 206 running Advanced IBM Unix (AIX) may not have such a restriction. Consequently, the translation module 212 may include a flush print job command just for the LINUX logical node 206.

In certain embodiments, the translation module 212 passes the software-layer commands to a direction module 214. The direction module 214 directs the software-layer commands to an appropriate one of the software layers of the logical node 206. The software layers define levels of abstraction grouping hardware and software that defines a logical node 206.

In one embodiment, the levels of abstraction defining the software layers, from most abstract to least abstract, include an application layer 216, a system layer 218, a firmware layer 220, and the hardware layer 222. The application layer 216 comprises applications, software, and processes that run or are configured to run within the Operating System (OS) of the logical node 206. The system layer 218 defines applications, threads, and processes that collectively define the OS. System layer 218 applications may include file systems, device drivers, process schedulers, daemons, system monitors, and the like. The firmware layer 220 comprises microcode and other software embedded in Read-Only Memory (ROM) such as Electronically Programmable Read Only Memory (EPROM). The hardware layer 222 represents the hardware allocated to the logical node 206. The hardware may be dedicated, shared, or a combination of shared and dedicated.

The direction module 214 directs software-layer commands to one or more of the software layers 216, 218, 220. Preferably, the hardware layer 222 is controllable by software-layer commands to one of the software layers 216, 218, 220. Alternatively, software-layer commands may be directed specifically to the hardware layer 222.

In one embodiment, the direction module 214 determines which software layer to deliver a software-layer command to based on the management scope. The management scope may be communicated with the management command as an identifier and included in the software-layer commands. Alternatively, the architecture may implicitly indicate the management scope. Preferably, the management scope possibilities correspond to the software layers 216, 218, 220 described above.

In certain embodiments, a pair of logical nodes 206 are configured into a peer-to-peer domain 224 with each other. In a peer-to-peer domain 224, two or more computing systems (i.e., logical nodes 206) have equivalent capabilities and responsibilities. In one embodiment, the peer-to-peer domain 224 includes a first logical node 206 configured to mirror data processing operations of a second logical node 206. In this manner, the first logical node 206 serves as a failover and/or backup for the second logical node 206. Each logical node 206 may actively service I/O communications such that if one logical node 206 fails, the other logical node 206 can continue to service further I/O communications without any disruption. This redundancy improves the overall reliability and performance of a data processing system.

Preferably, the communication module 208 is configured to communicate management commands 202 directly (indicated by arrow 226) to the peer-to-peer domain 224 as a single entity. This relieves an administrator using the UI 210 to send management commands 202 from specifically addressing each management command 202 to a separate logical node 206 in the peer-to-peer domain 224. In certain embodiments, the communication module 208 may direct certain management commands 202 to a specific logical node 206 of the peer-to-peer domain 224 as needed. For example, if a logical node 206 of the peer-to-peer domain 224 has failed, the communication module 208 may send recovery specific management commands 202 exclusively to the failed logical node 206.

Figure 3:
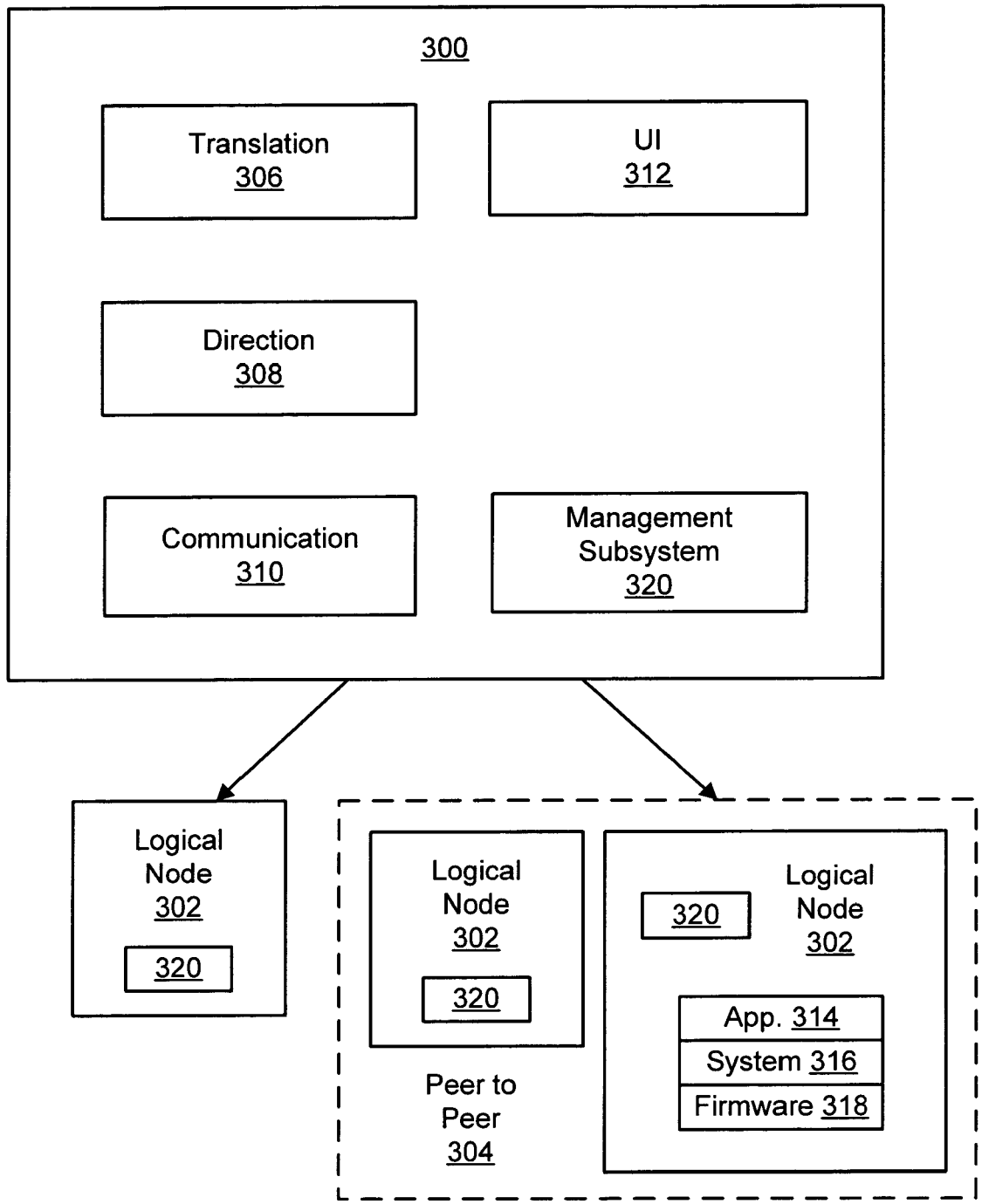
FIG. 3 is a logical block diagram illustrating an alternative embodiment of an apparatus for facilitating management of logical nodes through a single management module in accordance with the present invention.

Referring now to FIG. 3, an alternative apparatus 300 for facilitating management of logical nodes through a single management module is illustrated. The apparatus 300 is in communication with a plurality of logical nodes 302 including a peer-to-peer domain 304 comprising at least two independent logical nodes 302. The apparatus 300 in certain embodiments includes a translation module 306, a direction module 308, a communication module 310, and a UI 312.

The translation module 306 performs substantially the same functions as translation modules 212 described in relation to FIG. 2. However, in the illustrated embodiment, the translation module 306 is centralized rather than being distributed to each logical node 206. Consequently, the translation module 306 may maintain configuration information relating to each logical node 206 for example, mapping tables that relate a general management command to functionally equivalent and compatible software-layer commands. Furthermore, the configuration information may include management command dependencies specific to particular logical nodes 206. The configuration information may also identify which software-layer commands can be sent to the peer-to-peer domain 304 and which should be sent to independent logical nodes 302 in the peer-to-peer domain 304. Configuration information may be stored in memory or persistent storage in files, a database, or the like.

The direction module 308 performs substantially the same functions as direction modules 214 described in relation to FIG. 2. However, in the illustrated embodiment, the direction module 308 is centralized rather than being distributed to each logical node 206. Consequently, the direction module 308 may access the configuration information to determine how to route the one or more software-layer commands to the software layers of the logical nodes 302 based on the management command scope. In one embodiment, the configuration information identifies a specific application executing on the application layer 314. The direction module 308 may route a software-layer command to the specific application by attaching an identifier to the software-layer command. A similar technique may be used to route software-layer commands to a system layer 316 or firmware layer 318. The application layer 314, system layer 316, and firmware layer 318 may correspond to similar layers 216, 218, 220 described in relation to FIG. 2.

The communication module 310 performs substantially the same functions as the communication module 208 described in relation to FIG. 2. However, in the illustrated embodiment, the communication module 310 communicates software-layer commands rather than management commands. In other words, the logic to process management commands into one or more software-layer commands is performed by the apparatus 300 such that just the software-layer commands need to be selectively communicated to the respective logical nodes 302 or peer-to-peer domain 304.

In one embodiment, the apparatus 300 and communication infrastructure between the apparatus 300 and the logical nodes 302 is developed as an original set of software modules. Alternatively, existing communication infrastructure is extended and added to provide the desired functionality of the present invention. In one embodiment, the communication module 310 communicates the one or more software-layer commands through a management subsystem 320 that logically links the apparatus 300 and the logical nodes 302. One example of such a subsystem that serves as the foundation for a management subsystem 320 in accordance with the present invention is a Resource Monitoring and Control (RMC) subsystem available from International Business Machines Corporation (IBM) of Armonk, N.Y. Those of skill in the art will recognize that a management subsystem 320 is not the same as a conventional RMC subsystem upon which it is built.

The RMC-based management subsystem 320 is a functional module that is typically incorporated in an operating system such as AIX. Of course, the management subsystem 320 may be implemented in other operating systems including LINUX, UNIX, Windows, and the like. Complimentary components of the management subsystem 320 may reside on both the apparatus 300 and the logical nodes 302.

The management subsystem 320 monitors resources such as disk space, processor usage, device drivers, adapter card status, and the like. The management subsystem 320 is designed to perform an action in response to a predefined condition. However, a conventional RMC is unable to interface concurrently with a pair of logical nodes 302 in a peer-to-peer domain 304. Instead, conventional RMC subsystems communicate with one logical node 302 at a time. Consequently, conventional RMC subsystems exhibit similar limitations (repetitive issuance of management commands) discussed in relation to management consoles 118 described in FIG. 1.

In certain embodiments of the present invention, a conventional RMC subsystem is extended and modified to create a management subsystem 320 capable of interfacing with a pair of logical nodes 302 in a peer-to-peer domain 304 as a single entity. The management subsystem 320 includes an object model that comprises objects representing each manageable resource of the one or more logical nodes 302.

As used herein, "resource" refers to firmware, software, hardware, and logical entities physically allocated to, or logically defined for, a logical node 302. Examples of resources include physical storage devices, storage device controllers, I/O devices, I/O device drivers, memory devices, memory controllers, processors, symmetric multiprocessor controllers, firmware devices, firmware executable code, operating systems, applications, processes, threads, operating system services, and the like. An object is representative of the features and attributes of physical and logical resources. The object may store information such as communication addresses, version information, feature information, compatibility information, operating status information, and the like. In certain embodiments, the objects comprise software objects that include both attributes and methods. The attributes store data about the object. The methods comprise logic configured specifically to implement certain functionality for the object. For example, one method may comprise a shutdown routine for an I/O card.

Preferably, the management subsystem 320 maintains the object model to include changes to the resources such as additions, deletions, and modifications to the resources of the logical nodes 302. The management subsystem 320 keeps the resource definitions synchronized between the apparatus 300 and the logical nodes 302. By extending the functionality of a conventional RMC, embodiments of the present invention may access a current and consistent object model in order to identify which resources to include in management commands.

The management subsystem 320 further includes a set of resource managers. The resource managers in one embodiment comprise the logic that interprets and applies management commands to resources that are defined in the object model. In certain embodiments, portions of a resource manager may reside on a logical node. The resource portions may implement the functionality described in relation to the translation module 212 and direction module 214 described above. Specifically, the management subsystem 320 may include resource managers specifically designed to interpret and implement management commands for the peer-to-peer domain 304 as a single entity.

Figure 4:
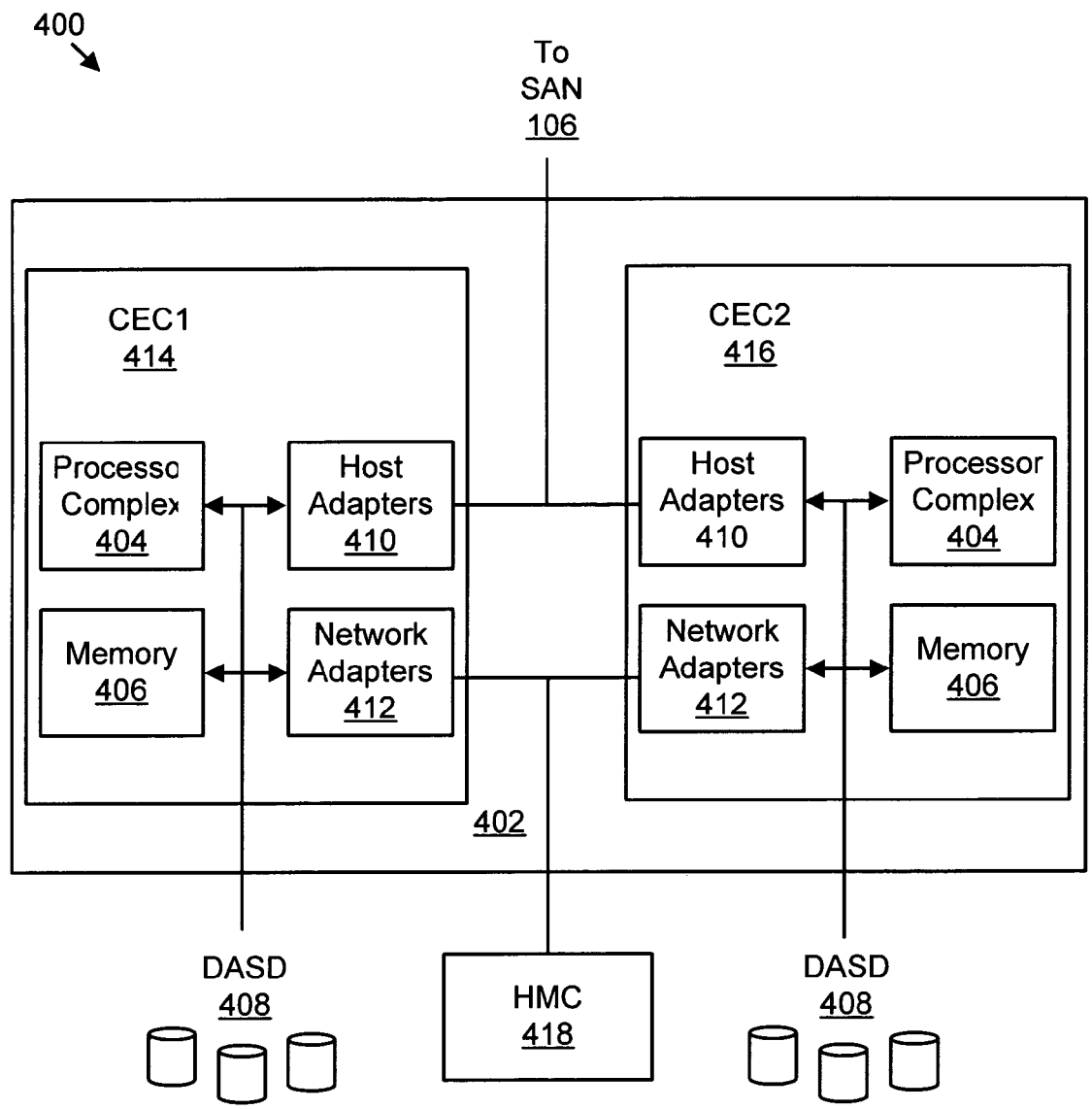
FIG. 4 is a schematic block diagram illustrating a representative system suitable for implementing certain embodiments of the present invention.

FIG. 4 illustrates system hardware suitable for implementing a system 400 to facilitate management of logical nodes through a single management module. As noted above, data processing systems continue to become more complicated as less expensive hardware is combined into a single physical enclosure. The hardware is then partitioned out either physically, logically, or with a combination of physical and logical partitioning into a plurality of logical nodes 206 (See FIG. 2).

In one embodiment suitable for use as a storage subsystem, the system 400 includes at least two physically separate Central Electronic Complexes (CECs) joined by a common hardware platform 402. The common hardware platform 402 may comprise a simple physical enclosure.

Figure 1:
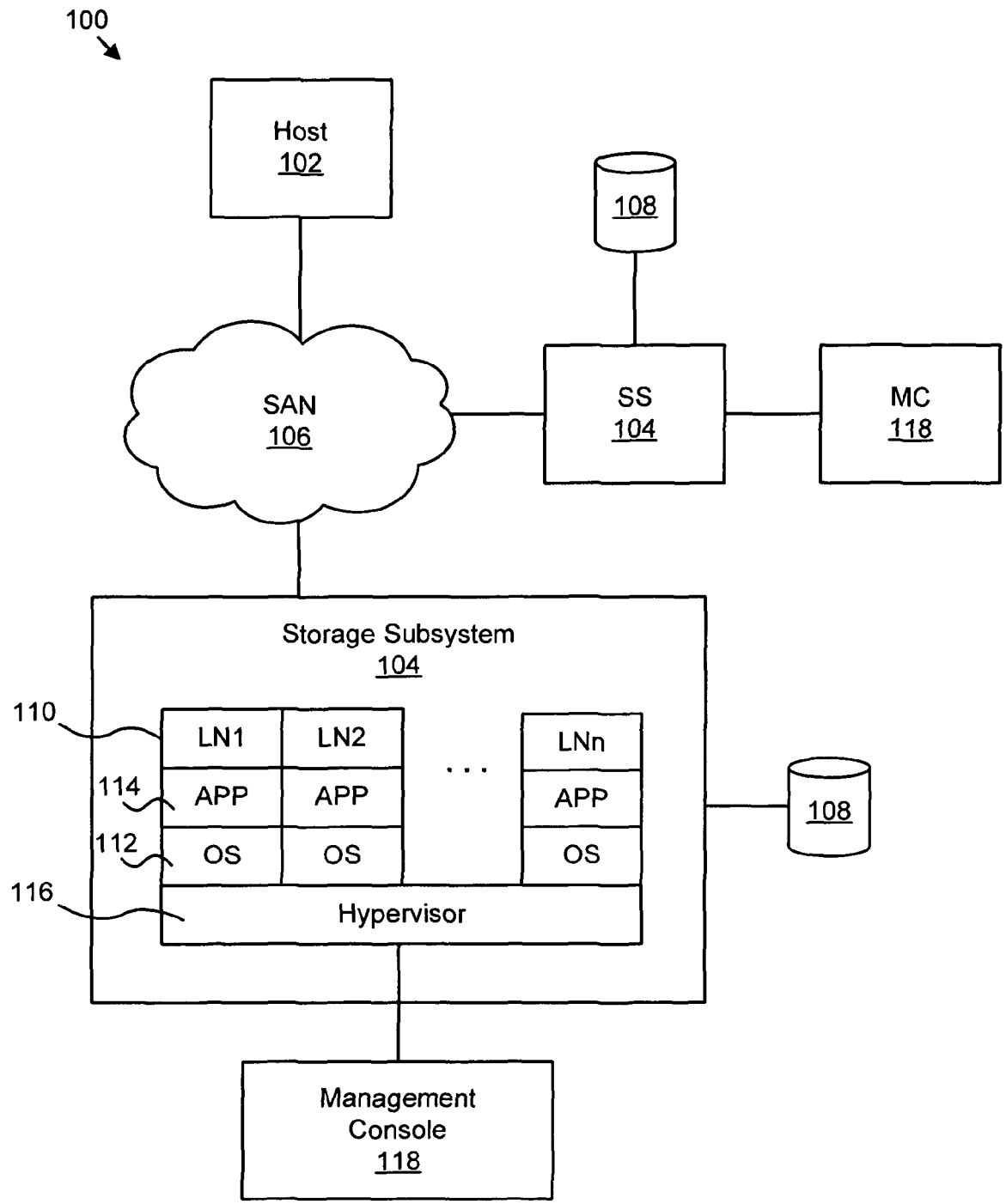
FIG. 1 is a block diagram illustrating a conventional system of managing a plurality of unrelated, independent logical nodes.

A CEC is an independent collection of physical computing devices connected to a common coordination module 116, such as a PHYP 116 (See FIG. 1). A CEC includes a plurality of symmetric multiprocessors organized in a processor complex 404, a plurality of electronic memory devices 406, a plurality of Direct Access Storage Devices (DASD) 408, a plurality of network I/O interface devices 410, such as host adapters 410, and a plurality of management interface devices 412, such as network adapters 412. The CEC includes a power coupling and power infrastructure as well as a ventilation and cooling system. Each CEC can be power cycled independently. Even certain subsystems can be power cycled without affecting performance of other parts of the CEC. Of course those of skill in the art will recognize that certain hardware devices described above may be organized into subsystems and include various controllers not relevant to the present invention but that enable the CEC to support a plurality of logical nodes 206.

In one embodiment, the system 400 includes a first CEC 414 and a second CEC 416. Preferably, the second CEC 416 includes substantially the same quantity, type, brand, and configuration of hardware as the first CEC 414. Having common hardware reduces the variables involved in troubleshooting a problem. In one embodiment, the first CEC 414 and second CEC 416 may be managed and controlled by a single Hardware Management Console (HMC) 418 connected via the network adapters 412. In one embodiment, the HMC 418 is a dedicated hardware management device such as a personal computer running a LINUX operating system and suitable management applications.

It should be noted that managing such a complex system 400 of hardware, even within a single CEC can be very challenging. Especially, if a goal of 24/7 availability is to be maintained. Consequently, the HMC 418 includes complex service and maintenance scripts and routines to guide administrators in servicing a CEC such that the highest level of availability can be maintained. A single mistake can have dramatic consequences. In certain embodiments, the management logic is embodied in a plurality of resource managers. The various resource managers monitor and check the health of the various hardware and software subsystems of the ESS. Software modules and scripts coach service technicians and systems administrators in diagnosing and fixing problems as well as performing preventative maintenance. Typically, these routines properly shutdown (power cycle) subcomponents and/or systems while the remaining hardware components remain online. Of course, these routines may perform more sophisticated maintenance and management procedures as well. For example, executing applications may be deactivated, various hardware components powered off, firmware updates made, and the whole processed reversed automatically by these scripts and routines. This may be accomplished such that firmware is properly updated and components are taken off-line and brought back online in the proper sequence to ensure no disruption in I/O services.

Figure 5:
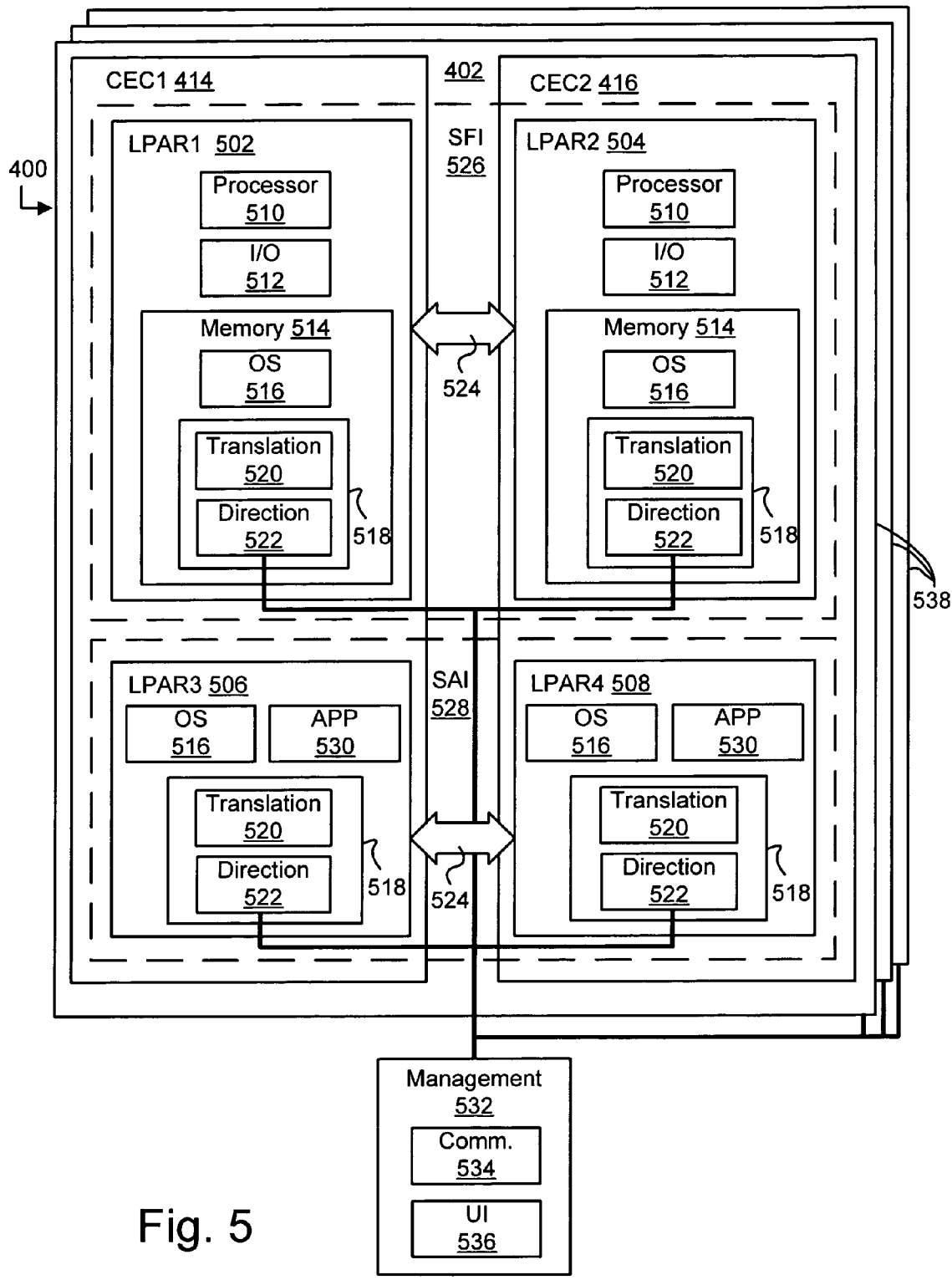
FIG. 5 is a schematic block diagram illustrating a logical representation of entities utilizing the system components illustrated in FIG. 4 according to one embodiment of the present invention.

FIG. 5 illustrates the hardware system 400 of FIG. 4 and includes the software and logical entities that operate on the hardware. The system 400 includes a first CEC 414 and a second CEC 416 within the common hardware platform 402. In one embodiment, the CECs 414, 416 are completely independent and operate within a storage subsystem.

The system 400 includes a first Logical Partition (LPAR) 502, second LPAR 504, third LPAR 506, and fourth LPAR 508. Certain systems 400 may comprise more LPARs than those illustrated. As discussed above, each LPAR 502-508 comprises an allocation of computing resources including one or more processors 510, one or more I/O channels 512, and persistent and/or nonpersistent memory 514. Certain computing hardware may be shared and other hardware may be solely dedicated to a particular logical node LPAR. As used herein, LPAR refers to management and allocation of one or more processors, memory, and I/O communications such that each LPAR is capable of executing an operating system independent of the other LPARs. Other terms commonly used to describe LPARs include virtual machines and logical nodes 206 (See FIG. 2).

In one embodiment, the first LPAR 502 and second LPAR 504 are homogeneous such that the configuration of the processors 510, I/O 512, and memory 514 is identical. Similarly, the software executing in the memory 514 may be homogeneous. The respective LPAR 502, 504 memory 514 may execute the same OS 516 and a resource manager 518.

Preferably, the resource manager 518 comprises logic for managing the specific LPAR 502, 504. The resource manager 518 may include a translation module 520 and a direction module 522. The translation module 520 and direction module 522 may comprise substantially the same logic as the translation module 212 and direction module 214 described in relation to FIG. 2. In certain embodiments, the resource managers 518 are software extensions of existing RMC modules executing on each LPAR 502. The resource managers 518 may extend object-oriented RMC modules or procedurally designed RMC modules.

In one embodiment, the first LPAR 502 operating on a first CEC 414 operates in a peer-to-peer relationship 524 with a second LPAR 504 operating on a second CEC 416. Together the first LPAR 502 and second LPAR 504 define a Storage Facility Image (SFI) 526. The SFI 526 provides a redundant logical resource for storage and retrieval of data. All data storage processing is typically logically split between LPAR 502 and LPAR 504, when one LPAR is not available the remaining LPAR processes all work. Preferably, the SFI 526 includes one LPAR 502 operating on physical hardware that is completely independent of the physical hardware of the second LPAR 504. Consequently, in preferred embodiments, the SFI 526 comprises a physical partitioning of hardware. In this manner, one CEC 416 may be off-line or physically powered off and the SFI 526 may remain on-line. Once the CEC 416 returns on-line, the resource managers 518 may synchronize the memory 514 and storage such that the second LPAR 504 again matches the first LPAR 502.

The SFI 526 may be further divided into logical storage devices. Preferably, the SFI 526 includes just the necessary software to store and retrieve data. For example, one SFI 526 may comprise a file system in the OS that permits storage and retrieval of data.

The system 400 may also include a Storage Application Image (SAI) 528 comprised of the third LPAR 506 and the fourth LPAR 508 in a peer-to-peer relationship 524. Preferably, the LPARs 506, 508 defining a SAI 528 include the same OS 516 and same resource manager 518. In certain embodiments, the OS 516 and/or resource manager 518 of an SFI 526 may differ from the OS 516 and/or resource manager 518 of the SAI 528.

The SAI 528 organizes storage applications into a single logical unit that can be managed independently of the logical and physical storage devices 408 (See FIG. 4) of the SFI 526. The SAI 528 also includes redundancy as the third LPAR 506 and fourth LPAR 508 mirror the operations of each other to facilitate switching over as needed should one LPAR 506,508 fail. While mirroring is a characteristic of the peer-to-peer relationship 524, certain operations may or may not be mirrored depending on the implementation. Preferably, the SFI 526 includes the third LPAR 506 operating on physical hardware that is completely independent of the physical hardware of the fourth LPAR 508. Consequently, in preferred embodiments, the SAI 528 comprises a physical partitioning of hardware. In this manner, one CEC 416 may be off-line or physically powered off and the SAI 528 may remain on-line. The storage applications 530 of the SAI 528 comprise applications specifically for managing storage and retrieval of data. Examples of storage applications include the Tivoli Storage Manager from IBM, a database management system, and the like.

A management module 532 is configured to selectively communicate management commands to the SFI 526 and/or SAI 528. Alternatively or in addition, the management module 532 may send management commands directly to individual LPARS 502-508 as needed. The management module 532 includes a communication module 534 and UI 536 that include substantially the same functionality as similar components described in relation to FIG. 2. Beneficially, the management module 532 abstracts the detail of multiple LPARS 502, 504 representing a single SFI 526 and allows a user to direct management commands to the whole SFI 526 with assurance that specific changes to each LPAR 502, 504 will be made. In one embodiment, one of LPAR, for example LPAR 502 receives the management command. The second LPAR 504 may be directed by the first LPAR 502 through the peer-to-peer relationship to also implement the management command rather than receiving the management command directly.

In certain embodiments, the management module 532 serves as the central point of management for a plurality of SFIs 526, SAIs 528, and the associated LPARs 502-508 defined therein. The management module 532 may be coupled through an out-of-band communication network to a plurality of hardware platforms 538. The management module 532 is preferably configured to send one or more software-layer commands or management commands to the SFIs 526 and SAIs 528 distributed across a plurality of platforms 538. Furthermore, each SFI 526 and/or SAI 528 may comprise a different OS 516 and/or set of applications 530. The SFIs 526 and/or SAIs 528 may be organized into management domains of common purpose, functionality, or other characteristic. The management module 532 may allow commands to be issued to select domains comprising an SFI 526, an SAI 528, or a combination of SFIs 526 and SAIs 528.

The present invention allows for abstract and generic management commands to be issued by the management module 532. Disparate SFIs 526, for example, will properly comply with the command, not only at the LPAR configuration level, but also at the OS 516 and application 530 levels. For example, an administrator may determine that a certain number of host adapter cards are to be replaced. The management module 532 may execute a script which issues management commands to selectively shutdown the software modules and power off the hardware components such that the SFIs 526 and SAIs 528 affected remain on-line. In such an example, the management module 532 may operate in stages. First, application level software modules for one LPAR of the affected SFIs 526 are shutdown. This may include the OS 516 and certain device drivers. Next, system level software modules for one LPAR of the affected SFIs 526 are shutdown. This may include the OS 516 and possibly certain microcode. Finally, the actual hardware (the host adapter cards or the host adapter card subsystem) is powered off by a command to a power controller of the CEC 414 from the management module 532. The administrator may then physically replace the cards. The management module 532 may then reverse the process to activate in turn the hardware, system level software, and application level software. Certain management commands may address a single LPAR of a SFI 526 or SAI 528 such that constant availability is maintained.

The management module 532 together with complimentary resource managers 518 on the LPARs 502-508 of the present invention provide a common management and control interface and may be referred to as an Application Program Interface. The present invention allows for generic abstract commands to effectively control select SFIs 526, SAIs 528, and the LPARs 502-508 that may have very different specific command and control commands and arguments.

Figure 6:
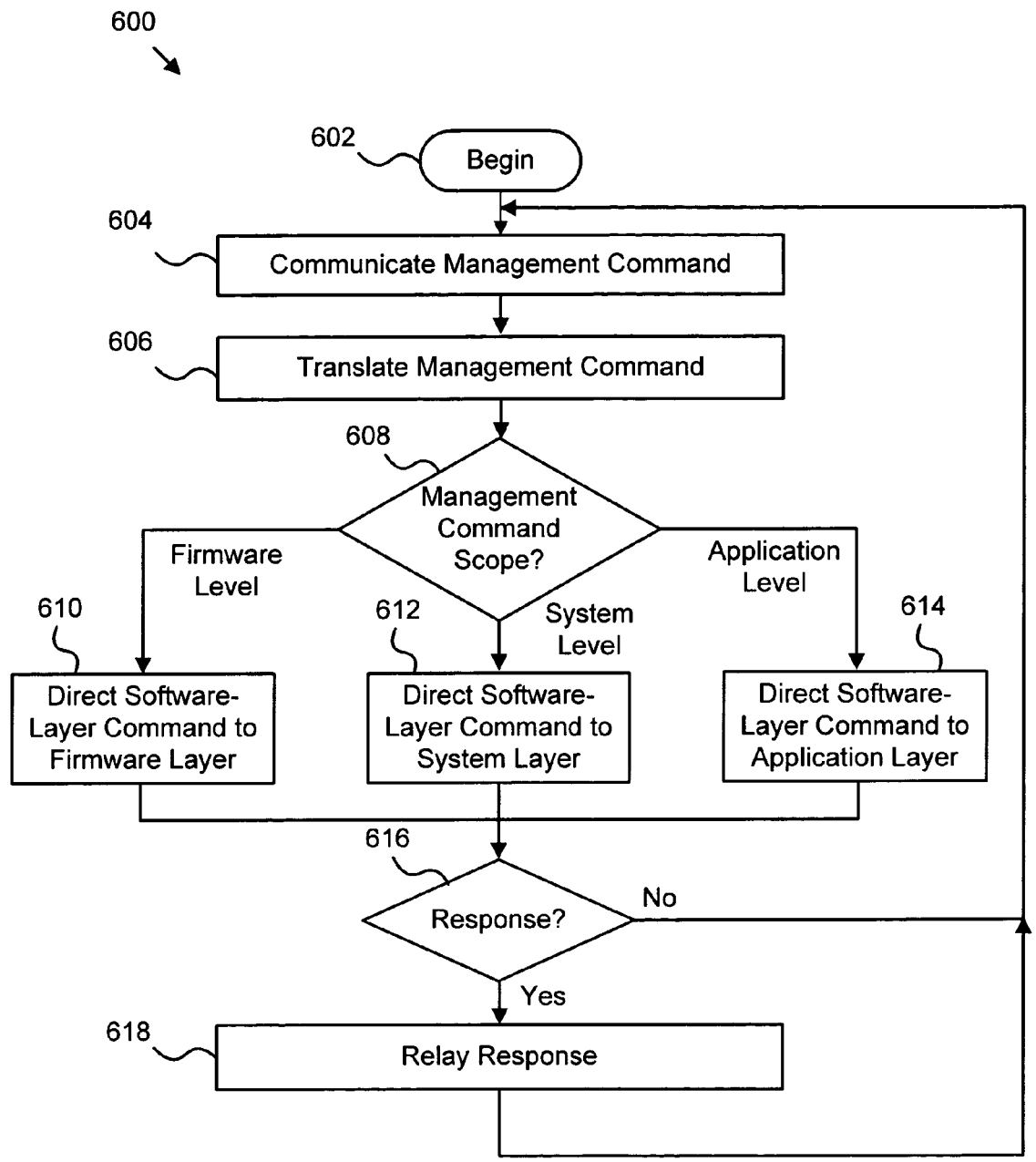
FIG. 6 is a schematic flow chart diagram illustrating a method for facilitating management of logical nodes through a single management module.

FIG. 6 illustrates a flow chart of a method 600 for facilitating management of logical nodes through a single management module according to one embodiment. The method 600 begins 602 once a user or automated software module determines that a management command should be issued to a logical node 206 (See FIG. 2). For example, a user may select a specific domain such as a management domain comprising two LPARs of a single SFI 526 or a single SAI 528. Alternatively, domains of SFIs 526 and SAIs 528 or individual LPARs 502-508 may be addressed by the UI 536.

Next, the communication module 534 communicates a management command selectively to the one or more logical nodes 206 (LPARs 502-508). In certain embodiments, the command is communicated via a management subsystem 320 such as a modified RMC. The command is received by the resource manager of the logical nodes 206 involved. There is no need for the user to specifically login to each logical node 206.

The translation module 212 translates the management command into one or more functionally equivalent software-layer commands. The software-layer commands are compatible with and recognized by the intended software layer of the logical node 206.

Next, a determination 608 is made regarding the management command scope. As described above, management command scope may be communicated using indicators that accompany the management command. If the management command scope is firmware level, the direction module 214 directs 610 the software-layer commands to the firmware layer 220 of the logical node 206. Software-layer commands to the firmware layer 220 may perform low-level maintenance such as powering off a specific card, resetting a hardware component, executing a microcode update overlay, and the like.

If the management command scope is system level, the direction module 214 directs 612 the software-layer commands to the system layer 218 of the logical node 206. Software-layer commands to the system layer 218 may perform mid-level maintenance such as updating device drivers, terminating run away threads or processes, resetting and OS 516, and the like.

If the management command scope is application level, the direction module 214 directs 614 the software-layer commands to the application layer 216 of the logical node 206. Software-layer commands to the application layer 216 may perform maintenance such as installing and removing software, installing or removing software features, configuring the software applications, and the like.

Once the direction module 214 has properly directed the software-layer commands, a determination 616 is made whether a response is required from the logical node 206. The response may comprise a simple acknowledgement. Alternatively, a response may include status information or error information. If no response to the management command is needed, the method 600 returns to communicate 604 a subsequent management command. In one embodiment, if a response is needed, the resource manager 518 of each logical node 206 may relay 618 the response back to the management module 532. The method 600 then returns to communicate 604 a subsequent management command.

Those of skill in the art will quickly recognize the potential benefits provided by the present invention. The ability to manage SFIs 526 and SAIs 528 individually or collectively and/or individual LPARs 502-508 saves the administrator significant time and significantly reduces the potential for errors and mistakes. Consequently, the common hardware platform and the SFIs 526 and SAIs 528 remains online longer and more consistently. Furthermore, the ability to control SFIs 526 and SAIs 528 having disparate operating systems and management software such as storage management applications reduces the number of management commands that a user must know. This also ensures that proper hardware/software dependencies and orders of operation are followed in managing and servicing hardware and software of a common hardware platform having a plurality of logical nodes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices, e.g., computer readable media. Similarly, operational data may be identified and illustrated herein within modules, and may be embodied in any suitable form and organized within any suitable type of data structure. The operational data may be collected as a single data set, or may be distributed over different locations including over different storage devices, e.g., computer readable media.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

What is claimed is:

1. An apparatus to facilitate management of logical nodes through a single management module, the apparatus comprising:
    a communication module configured to selectively communicate a management command from a single management module to a plurality of logical nodes, wherein the plurality of logical nodes comprises at least a first Logical Partition (LPAR), second LPAR, third LPAR, and fourth LPAR, the first and third LPARS defining a first Central Electronics Complex (CEC) operatively coupled to a hardware platform and the second and fourth LPARs defining a second CEC operatively coupled to the hardware platform, and the first and second LPARS defining a Storage Facility Image (SFI) and the third and fourth LPARs defining a Storage Application Image (SAI), wherein the first LPAR operates using computing resources of the first CEC, the second LPAR operates using computing resources of the second CEC, the third LPAR operates using computing resources of the first CEC, and the fourth LPAR operates using computing resources of the second CEC;
    a plurality of translation modules, each of the first, second, third, and fourth LPARs comprising a corresponding one of the plurality of translation modules, wherein each translation module is executable by the corresponding LPAR, each translation module being configured to translate the management command into one or more functionally equivalent software-layer commands recognized by one of the software layers of the corresponding LPARs, each of the one or more software-layer commands being configured for compatibility with the corresponding LPAR, and wherein each translation module translates the management command after the management command is received by the LPAR from the communication module; and
    a plurality of direction modules, each of the plurality of LPARS comprising a corresponding one of the plurality of direction modules, wherein each direction module is executable by the corresponding LPAR, each direction module configured to direct respective software-layer commands to an appropriate one of the software layers of the corresponding LPAR according to a management command scope;
    wherein the communication, translation, and direction modules each comprises at least one of logic hardware and executable code, the executable code being stored on one or more non-transmissible computer readable media.

2. The apparatus of claim 1, wherein the first and second LPARs are in a peer-to-peer domain with each other such that the first LPAR mirrors data processing operations of the second LPAR.

3. The apparatus of claim 1, wherein the third and fourth LPARS are in a peer-to-peer domain with each other such that the third LPAR mirrors data processing operations of the fourth LPAR.

4. The apparatus of claim 1, further comprising a user interface configured to allow a user to direct the management command to a domain, the domain comprising at least two logical nodes.

5. The apparatus of claim 1, wherein the communication module, translation module, and direction module cooperate to pass the software-layer commands through a management subsystem linking the management module and the one or more logical nodes.

6. The apparatus of claim 5, wherein the management subsystem comprises an object model representative of firmware, software, hardware, and logical entities present on the logical nodes.

7. The apparatus of claim 1, wherein the software layers are selected from the group consisting of an application layer, a system layer, and a firmware layer.

8. The apparatus of claim 1, wherein the single management module comprises a dedicated management hardware device.

9. The apparatus of claim 1, wherein the communication module and management module comprise portions of a management console, and wherein the translation module and direction module comprise portions of a server, the management console being communicable with the server over a communication network.

10. A system to facilitate management of logical nodes through a single management module, comprising:
    a first Central Electronics Complex (CEC) operatively coupled to a hardware platform, the first CEC comprising a plurality of symmetric multiprocessors organized into a first processor complex, a plurality of electronic memory devices, a plurality of direct access storage devices, a plurality of network Input/Output (I/O) interface devices, and a plurality of management interface devices, each of the devices of the CEC electronically coupled for exchange of data and control information;
    a second CEC operatively coupled to the hardware platform, the second CEC comprising a plurality of symmetric multiprocessors organized into a second processor complex, a plurality of electronic memory devices, a plurality of direct access storage devices, a plurality of network Input/Output (I/O) interface devices, and a plurality of management interface devices, each of the devices of the CEC electronically coupled for exchange of data and control information;

at least one Storage Facility Image (SFI) comprising a first Logical Partition (LPAR) defined to operate using computing resources of the first CEC and a second LPAR defined to operate using computing resources of the second CEC, the first LPAR in a peer-to-peer domain with the second LPAR such that the second LPAR mirrors data processing operations of the first LPAR, the first LPAR and second LPAR dedicated to storage and retrieval of data;

at least one Storage Application Image (SAI) comprising a third Logical Partition (LPAR) defined to operate using computing resources of the first CEC and a fourth LPAR defined to operate using computing resources of the second CEC, the third LPAR in a peer-to-peer domain with the fourth LPAR such that the fourth LPAR mirrors data processing operations of the third LPAR, the third LPAR and fourth LPAR dedicated to data storage applications;

a management module in communication with a communication module configured to selectively communicate a management command from the management module to one or more of the at least one SFI and at least one SAI;

a plurality of translation modules, each of the first, second, third, and fourth LPAR comprising an associated one of the plurality of translation modules, wherein each translation module is configured to translate the management command into one or more functionally equivalent software-layer commands recognized by one of the software layers of the associated LPAR included in the at least one SFI and at least one SAI, the software-layer commands configured for compatibility with the associated LPAR, wherein each of the plurality of translation modules translates the management command after the management command is received by the associated LPAR from the communication module; and a plurality of direction modules each configured to direct the one or more software-layer commands for an associated LPAR to an appropriate one of the software layers of the associated LPAR according to a management command scope.

11. The system of claim 10, wherein the communication module communicates the one or more software-layer commands to corresponding software layers of a plurality of SFIs and SAIs defined for a plurality of hardware platforms.

12. The system of claim 10, further comprising a user interface configured to allow a user to direct the management command to one or more domains, each domain comprising an SFI, an SAI, or a combination of SFIs and SAIs.

13. The system of claim 10, wherein the communication module communicates the one or more software-layer commands through a management subsystem linking the management module and the at least one SFI and at least one SAI.

14. The system of claim 13, wherein the management subsystem comprises an object model representative of firmware, software, hardware, and logical entities present on the at least one SFI and at least one SAI.

15. The system of claim 10, wherein the software layers are selected from the group consisting of an application layer, a system layer, and a firmware layer.

16. The system of claim 10, wherein the management module comprises a dedicated management hardware device.

17. The system of claim 10, wherein the management module and communication module comprise portions of a management console, and wherein the translation modules and the one or more of the at least one SFI and at least one SAI comprise portions of a server, the management console being communicable with the server over a communication network.

18. A non-transmissible computer readable medium tangibly embodying a program of machine-readable instructions executable by a digital processing apparatus to perform operations to facilitate management of logical nodes through a single management module, the operations comprising:

an operation to communicate a management command selectively from a single management module to a plurality of logical nodes, wherein the plurality of logical nodes comprises at least a first Logical Partition (LPAR), second LPAR, third LPAR, and fourth LPAR, the first and third LPARs defining a first Central Electronics Complex (CEC) and the second and fourth LPARs defining a second CEC, and the first and second LPARS defining a Storage Facility Image (SFI) and the third and fourth LPARS defining a Storage Application Image (SAI), wherein the first LPAR operates using computing resources of the first CEC, the second LPAR operates using computing resources of the second CEC, the third LPAR operates using computing resources of the first CEC, and the fourth LPAR operates using computing resources of the second CEC;

an operation to separately translate the management command at each of the first second, third, and fourth LPARS into one or more functionally equivalent software-layer commands recognized by one of the software layers of an associated LPAR, the software-layer commands configured for compatibility with an associated LPAR, wherein the management command is separately translated by the LPARS after the management command is communicated from the single management module to the LPARS; and an operation to separately direct respective software-layer commands to an appropriate one of the software layers of an associated LPAR according to a management command scope.

19. The computer readable medium of claim 18, wherein the first and second LPARs are in a peer-to-peer domain with each other such that the first LPAR mirrors data processing operations of the second LPAR.

20. The computer readable medium of claim 19, wherein the third and fourth LPARS are in a peer-to-peer domain with each other such that the third LPAR mirrors data processing operations of the fourth LPAR.

21. The computer readable medium of claim 18, further comprises an operation to present a user interface configured to allow a user to direct the management command to a domain, the domain comprising at least one of the SFI and SAI.

22. The computer readable medium of claim 18, wherein the operation to direct the software-layer commands further comprises an operation to pass the software-layer commands through a management subsystem linking the management module and the LPARs.

23. The computer readable medium of claim 22, wherein the management subsystem comprises an object model representative of firmware, software, hardware, and logical entities present on the LPARs.

24. The computer readable medium of claim 18, wherein the software layers are selected from the group consisting of an application layer, a system layer, and a firmware layer.

25. The computer readable medium of claim 18, wherein the single management module comprises a dedicated management hardware device.

26. The computer readable medium of claim 18, further comprising an operation to relay response messages from the LPARs to the single management module.

27. The computer readable medium of claim 18, wherein the software-layer commands are communicated out-of band.

28. The computer readable medium of claim 18, wherein the operation to communicate the management command comprises communicating the management command from a management console comprising the single management module across a communication network to a server comprising the LPARS.

29. A method for facilitating management of logical nodes through a single management module, the method comprising:
communicating a management command selectively from a single management module to a plurality of logical nodes, wherein the plurality of logical nodes comprises at least a first Logical Partition (LPAR), second LPAR, third LPAR, and fourth LPAR, the first and third LPARS defining a first Central Electronics Complex (CEC) operatively coupled to a hardware platform and the second and fourth LPARS defining a second CEC operatively coupled to the hardware platform, and the first and second LPARs defining a Storage Facility Image (SFI) and the third and fourth LPARs defining a Storage Application Image (SAI), wherein the first LPAR operates using computing resources of the first CEC, the second LPAR operates using computing resources of the second CEC, the third LPAR operates using computing resources of the first CEC, and the fourth LPAR operates using computing resources of the second CEC;
separately translating the management command at each of the first, second, third, and fourth LPARs into one or more functionally equivalent software-layer commands recognized by one of the software layers of an associated LPAR, the software-layer commands configured for compatibility with an associated LPAR, wherein the management command is separately translated by the LPARs after the management command is communicated from the single management module to the LPARS; and
separately directing respective software-layer commands to an appropriate one of the software layers of an associated LPAR according to a management command scope.

30. The method of claim 29, wherein communicating the management command comprises communicating the management command from a management console comprising the single management module across a communication network to a server comprising the LPARs.

31. An apparatus for facilitating management of logical nodes through a single management module, the apparatus comprising:
means for communicating a management command selectively from a single management module to a plurality of logical nodes, wherein the plurality of logical nodes comprises at least a first Logical Partition (LPAR), second LPAR, third LPAR, and fourth LPAR, the first and third LPARs defining a first Central Electronics Complex (CEC) and the second and fourth LPARs defining a second CEC, and the first and second LPARs defining a Storage Facility Image (SFI) and the third and fourth LPARs defining a Storage Application Image (SAI), wherein the first LPAR operates using computing resources of the first CEC, the second LPAR operates using computing resources of the second CEC, the third LPAR operates using computing resources of the first CEC, and the fourth LPAR operates using computing resources of the second CEC;
means for separately translating the management command at each of the first second, third, and fourth LPARs into one or more functionally equivalent software-layer commands recognized by one of the software layers of an associated LPAR, the software-layer commands configured for compatibility with an associated LPAR, wherein the management command is separately translated by the LPARS after the management command is communicated from the single management module to the LPARS; and
means for separately directing respective software-layer commands to an appropriate one of the software layers of an associated LPAR according to a management command scope;
wherein the means for communicating, means for translating, and means for directing each comprises at least one of logic hardware and executable code, the executable code being stored on one or more non-transmissible computer readable media.

32. The apparatus of claim 31, wherein the means for communicating a management command and the single management module comprise portions of a management console, and wherein the means for translating the management command and the means for directing the software-layer commands comprise portions of a server, the management console being communicable with the server over a communication network.

* * * * *